United States Patent [19]
Baugh et al.

[11] Patent Number: 5,505,886
[45] Date of Patent: Apr. 9, 1996

[54] PROCESS FOR DENSIFICATION OF LOW DENSITY POLYSTYRENE

[75] Inventors: Mark R. Baugh, Smithfield; Reed M. Nielsen; Jerry L. Goodwin, Logan, all of Utah

[73] Assignee: Utah State University Foundation, North Logan, Utah

[21] Appl. No.: 989,348

[22] Filed: Dec. 11, 1992

[51] Int. Cl.$^6$ .................................................. B29C 43/04
[52] U.S. Cl. ........................... 264/37; 264/102; 264/321; 264/DIG. 69
[58] Field of Search .................. 264/102, 37, DIG. 69, 264/321

[56] References Cited

U.S. PATENT DOCUMENTS

| | | | |
|---|---|---|---|
| 3,080,612 | 3/1963 | Buchmann | 264/DIG. 69 |
| 3,344,212 | 9/1967 | Francis | 264/37 |
| 3,504,399 | 4/1970 | Wolf | 425/307 |
| 3,922,131 | 11/1975 | Stegmeier | 425/223 |
| 4,254,068 | 3/1981 | Otsuka | 264/321 |
| 4,328,368 | 5/1982 | Salloum et al. | 264/37 |
| 4,393,116 | 7/1983 | Taylor | 264/319 |
| 4,448,737 | 5/1984 | Johnson | 264/321 |
| 4,706,560 | 11/1987 | Capodicasa | 100/102 |
| 5,114,331 | 5/1992 | Umehara et al. | 264/37 |
| 5,236,655 | 8/1993 | de Soet | 264/DIG. 69 |

FOREIGN PATENT DOCUMENTS 55-150323  11/1980  Japan.

*Primary Examiner*—Allan R. Kuhns
*Attorney, Agent, or Firm*—Trask, Britt & Rossa

[57] ABSTRACT

A method and apparatus are provided for densifying expanded polymer materials such as styrofoam for transportation between collection centers and manufacturing plants for recycling. The method and apparatus use only pressure and time with no addition of heat which would render the expanded polymers non-recyclable or impure. The method and apparatus rely on mechanical creep over a relatively long time with no binding materials or restraining packaging which would have to be removed prior to remanufacturing. The method and apparatus compress the expanded polymer material in three directions and confine it for the period of time required for the polymers to mechanically creep to a permanent block having a high density. The high density will not expand significantly after the block is released, unconfined into the ambient. The blocks may be easily loaded for efficient, economical transportation.

22 Claims, 11 Drawing Sheets

PROCESS FOR DENSIFICATION OF LOW DENSITY POLYSTYRENE

BACKGROUND OF THE INVENTION

1. Field of the Invention

This invention relates to the field of recycling of polymers and in particular to densification, permanent compaction of expanded polymer materials, alternatively called foamed polymers, without binders or baling for economical transportation from collection points to remanufacturing sites for recycling.

2. Description of the Art some have sought to recycle expanded (foamed) polymer materials in particles or large shapes by simply returning them to a manufacturer capable of recycling them. The difficulty with transporting expanded polymer materials is that they require enormous space in comparison to their weight. Their densities are so low as to waste the volume of a transport vehicle. That is, a truck, train or other transportation medium can "gross out" or "cube out" by receiving a load which meets the maximum weight or volume capacity, respectively, of the transportation medium. Expanded polymer materials "cube out" all transportation media but have minimal weight, rendering transportation uneconomical.

For example, trucks have a licensed weight limit and also a mechanical limit for the structure and the suspension. Ships have a gross weight limit dictated by the required freeboard above the water line. Trains have a maximum weight which the road bed and rails with intermediate supporting structure can support. On the other hand, any container, truck body, ship's hold or train car has a maximum number of cubic feet into which products can be placed. In hauling lead ingots, any transportation medium will be "grossed out" by the extremely dense ingots before it is "cubed out." Hauling styrofoam, a truck may "cube out" with less than one ton of weight in a forty-foot semi-trailer. Expanded polystyrene, styrofoam, typically has a density between 0.5 and 4.5 pounds per cubic foot, whereas steel has a density of almost 500 pounds per cubic foot. Moreover, the intrinsic value of steel per pound is high compared to the value of styrofoam and many recyclable polymers. A higher percentage of value is lost to transportation of recyclable polymers.

Most of the art of recycling polymer foams, alternately called expanded polymer materials, does not treat the transportation issue. Remanufacturing methods dominate the art. Patents deal with reforming or recasting ground waste materials. Polyurethane foam, shredded, remolded and re cut, is a good example.

U.S. Pat. No. 2,892,216 (Steel, 1959) discloses a method of recovering scrap from foam rubber by adding a polyurethane elastomeric binder to pieces of scrap polymeric material. Numerous binding and curing agents are mentioned with a feed screw for mixing. The maximum density disclosed is 13 lbs. per cubic foot from shredding of the scrap into crumbs, mixing it with the uncured binder, and molding the crumbs together until the binder cures by evaporation of a volatile solvent or by heat.

U.S. Pat. No. 3,452,122 (Stern et al., 1969) discloses a method of producing uniformly colored, foamed materials by means of using waste foam materials of various diverse colors bonded together with a polyurethane binder including a pigment and swelling agent which enables the pigment to penetrate substantially uniformly through even the waste foam which is also expanded.

U.S. Pat. No. 3,517,414 (Carson, 1967) discloses an apparatus for processing plastic material using scrap foam material cut into small pellets or pieces on the order of ⅛ to ¼ inch maximum dimension. The pieces are mixed together with a plastic foam material which forms a binder. The mixture is cured in a mold to form a cylindrical body which is rotated about its axis while sheets are cut off in a thin continuous layer of recycled foam product.

Some recycling of expanded polystyrene, commonly called styrofoam, has been addressed. Remanufacturing is well known since polystyrene is a thermoplastic polymer rather than a thermoset one like epoxy or a reaction-cured polymer like polyurethane. However, polystyrene is severely hampered by its very virtues of light weight and high strength. It is not easily compressed and does not have enough density in most of its forms to make transportation to a central recycling center economical.

The prior art has relied on baling of light weight materials such as foamed polymers and cardboard boxes. Baling machines are known in the art and typically have a platen which compresses a stack or bin full of compressible materials against an anvil. After compression, bands or other retention means are placed around the slug of compressed material. The compressed material must then be transported as a bale to the location of re-use or other disposition.

Another method of recycling involves reusing polystyrene foam pellets in outgoing shipping for packaging material. That is, incoming packaging is emptied by large suction pipes which transport all the polystyrene pieces to a holding bin from which outgoing packages can be filled with beads or particles.

Some polymers, particularly elastomers such as polyurethane, are shredded and re-formed using binding elastomers spread or mixed among the shredded particles of recycled polymer foam.

U.S. Pat. No. 3,004,293 (Kreidl, 1959) teaches a method of compression of urea formaldehyde foam particles having a high moisture content and a bulk weight of less than two pounds per cubic foot without substantially impairing the cellular structure of the particles in the cohered mass. The method relies on adhesive binders as well as fillers.

U.S. Pat. No. 3,164,860 (Oxell, 1961) teaches an apparatus for uniformly mixing and charging a substance into a mold. The basic problem addressed is achieving uniform mixing of non-uniform particles when a lightweight particulate matter such as thermoplastic beads must be mixed with a heavier binding material. Particularly where the binding material is a liquid, lighter particles float above rather than mix in with the binder. Screw conveyers are used to promote mixing and to move the material from a hopper to a mold. Compression is only necessary to maintain good bonding between a binder and a granular material is used.

U.S. Pat. No. 1,803,814 (Spengler, 1928) discloses a process and apparatus for making pressed bodies of powderous material by uniaxial compression of a wetted powder for cohesion. The method teaches uniaxial compression heating, and open sides for escape of captured air. The method is a repeated layering and compression of a powdered material on a table. The process produces a batched block end product.

U.S. Pat. No. 2,307,371 (Hileman, 1941) discloses a method of introducing a frozen, moist, pulverized granular material into a mold and uniaxially compressing it to create a solid mass. The method relies on freezing granules, which melt at their interfaces due to the high pressure, and refreeze upon release of the pressure. An upper and lower plunger compress in the mold which is then emptied by one plunger, driving the formed article out.

Several patents specifically treat densification of expanded polystyrene (EPS), also known as styrofoam, for purposes of recycling. Although two principal processes of densification include compression and melting, extrusion may become principally melting in some of the apparatus disclosed. When extremely high pressures are applied for a short time, the process usually is one of adding work mechanically to the polymer material. The mechanical work, added at high pressure, is converted to thermal energy which melts the expanded polymer. The polymer exits and cools to a dense solid which must then be ground.

U.S. Pat. Nos. 4,436,682 (Knopp 1984) and 3,577,589 (Serrano 1969) disclose various apparatus which primarily extrude plastics. Knopp discloses a roller process which produces a sheet. Serrano discloses a radially moving feedstock of foamed thermoplastic extruded between rotating extrusion disks. The densified plastic is discharged as curds which are later ground.

U.S. Pat. No. Nos. 3,859,404 (Immel et al. 1975), 3,752,631 (Corbett et al. 1973) and 3,607,999 (Corbett et al. 1971) disclose various apparatus which melt a feedstock of plastic foam. Both the U.S. Pat. Nos. 3,752,631 and 3,607,999 to Corbett et. al. disclose radiant heating to melt foamed plastic. Immel discloses a method using steam to melt plastic foam.

Densifying expanded polystyrene foam with heat can be fast and continuous on a conveyor. Energy and space requirements can be substantial, with fumes an issue as well.

Heat quickly causes polymer chains to retract from their expanded, foamed positions. However, since the method is typically in open air as a practical matter, oxidation degradation of the polymers occurs. Degradation of the polymer treated is undesirable as it changes the chemistry of the polymer, changing the resultant material properties. Degraded polymeric chains become impurities virtually impossible to remove. The ability to be recycled is impaired.

Another method of compressing expanded polymers such as polystyrene includes compression within a container by a platen or wall of the container. Such a device has been produced with a hopper having a movable wall for compression.

The hopper is filled with polymer foam pieces and the platen, the one movable wall, applies a force to crush the material. The platen is repeatedly retracted, additional material is added and the platen crushes the net contained material. After several cycles, the platen is held in place for a time sufficient for the compressed polymer foam to take a permanent set and remain densified.

One of the major difficulties of the foregoing process is that the operation is too slow. The entire apparatus is occupied for each load as it is held for the required relaxation time, the time taken by the polymer foam to mechanically creep, take on a permanent set. The polymer comes out as a large block. Meanwhile the compression process is not very effective when the path of escape for air captured within the polymer foam is half the width of the face of the large platen required. The pressure on such a very large platen creates severe structural difficulties in a unit of commercially desirable size. Also, the large block is difficult to handle. A fork truck or similar equipment may be necessary.

Effective recycling technology for foamed polymers should address expanded polystyrene which is used in numerous industrial and consumer applications. Polymer recycling needs an economical method of densification, permanent compression, which can obtain a density of 25–30 pounds per cubic foot without the use of binders, packaging or baling for restraint. Large expensive machinery for compression should be minimized and effectively used when required. The method must not cause thermal degradation of the polymer by excessive temperature excursions. The recyclable polymer, after compression, should be adaptable to efficient stacking by hand or machine. Transportation should be economical by truck to a recycling center. Recycling should include operators who can extrude pellets for resale to manufacturers as feedstock for molding machines.

Since the volume of expanded polymers drives up the cost of transportation, and cost is a great deterrent to recycling, compression as close to the site of collection as possible is preferred. Preferably the cost of a densification machine should be modest for proliferation near as many collection sites as possible.

Sites such as business receiving docks, fast food restaurants, and similar locations having a high-volume throughput of expanded polymer packaging are ideal sites for a densification system.

Capital cost will, of course, influence how widespread the installed machines become. Floor area, commonly called "footprint," is an extremely important element of cost. A commercially reasonable densification system should have minimum size. Similarly, minimum costs of operation, maximum safety for personnel, maximum reliability, a minimum number of parts, minimal precision requirements and low wear rates are desirable attributes of such a densification system.

SUMMARY OF INVENTION

The present invention meets the need for intermediate densification of expanded polymers by providing a compression process followed by a retention process. The expanded polymer is first compressed to a reduced volume and then constrained to that reduced volume for a time. The time period is sufficient for escape, via diffusion, of gases trapped within the expanded polymer. In addition, the time period is designed to allow "creep" to occur within the polymer chains. "Creep" is inelastic deformation of a polymer occurring over time. Given sufficient deformation and time, a polymer will take on a new shape as the various polymer chains are distorted until they rearrange themselves in the new orientation.

Mechanical creep, also called viscoelastic creep or simply creep, is a permanent inelastic distortion which exists in virtually all materials. Nevertheless, mechanical creep is insignificantly small in such materials as ceramics. Creep is insignificant in many metals at load levels associated with common structural engineering. However, in polymers, a load which is well within the structural limitations of the polymer typically induces a permanent inelastic deformation in the polymer when the load is applied for an extended period of time. Time and stress influence creep, permanently straining a material, but not by general yielding.

In the instant invention, mechanical creep is used to advantage by maintaining a substantial load on the expanded polymer material for a significant period of time. Thus, the densified polymer material which results from the process and apparatus of the instant invention does not change in any dimension more than a nominal small percentage, less than 10 percent and usually less than 5 percent in any given dimension. Thus, one can say that the densified polymer material substantially conforms to the space in which it is confined.

Polymers have substantial elastic properties. Confinement seldom reduces volume permanently to the confined space. Some elastic expansion occurs quickly and some slowly when confining loads are released.

Thus, mechanical creep permanently deforms while elastic deformation temporarily deforms. Elastic deformation is recovered when confinement ceases. The permanent deformation of creep remains.

In the instant invention it is proper to speak of substantially conforming to a volume or maintaining a substantially constant volume. Once unconfined, a block of densified polymer material changes volume a small non-zero amount.

In the process of mechanical creep, one or more dimensions of a polymer material may be distorted or loaded for an extended time. Creep is dependant upon the load (pressure, stress) condition and the time that the load condition is maintained. A polymer material, unlike many other structural materials, does not completely resist distortion of a dimension by a constant force less than yield.

If creep is induced by a constant force, then the polymer material will continually creep. Creep will continue but at a lessening rate with time. On the other hand, if creep is induced within a polymer material by confinement to a specific dimension, then the initial resistance force with which the polymer resists the change in dimension will decay with time and creep. Either confinement to a dimension or application of a force will induce creep, and both are comprehended within the invention.

In the instant invention, forces may result from a reduction of volume of the expanded polymer material, the confining forces do not stay constant. The confining force is comprised of the elastic forces in the polymer and the inelastic forces which eventually fade under creep conditions. Thus, in the instant invention the substantial maintenance of a force is either the maintenance of a force necessary to maintain creep or the maintenance of a dimension such that creep will continue. Creep will reduce any inelastic resistance forces in the polymer. Over time, the polymer material will substantially conform to the dimensions of the confinement.

For creep to substantially cease, the forces within a confined polymer usually decay until dominated by the elastic forces within the polymer. Creep in styrofoam causes a decay of inelastic forces until they represent a small portion or even an insignificant fraction of the total confinement pressure. Likewise, only a small fraction of the original inelastic component of the total pressure might remain.

To speak of creep substantially ceasing means that the inelastic forces have decayed to less than or equal to the order of magnitude of elastic forces. The elastic change in dimension due to removal of all constraints is greater, typically than the total additional inelastic deformation which could occur were the load maintained indefinitely.

Because the apparatus of the invention causes elastic an inelastic distortion, it is proper to speak of substantially conforming to a confining volume. A polymer material substantially conforms when the possible additional inelastic distortion at the load or volume applied is less than the elastic distortion. This is the approximation to holding a load for an infinite time, within the bounds of practicality.

The invention provides a hopper to feed the expanded polymer pieces into the compression unit, and may include a grinder to shred larger expanded polymer pieces to a maximum dimension which will yield more uniform densities in the compressed product.

The compression unit is distinct from the retention unit. Maximum efficiency dictates that the compression unit, which has the moving parts and the highest capital cost should be in continuous operation and not stopped for extended periods to provide for creep.

In accordance with one aspect of the present invention, a compression chamber is provided which includes a first platen opposite a first anvil, a second platen opposite a second anvil, and a third platen opposite an output port. The output port leads directly into an extrusion tube, alternately called a retainer chute, through which a continuous stream or ribbon of densified polymer material travels. The compression chamber further has an input port from a hopper for feeding pieces of expanded polymer into the compression chamber.

Each platen carries a drive linkage which might be a hydraulic cylinder, lever, four bar linkage, double link mechanism or other loading mechanism. The double link is a type of four bar linkage comprising a pair of links, arms, hinged together at the proximal end of each to work like an elbow. The distal end of the first link hingedly attaches to a fixed location. The distal end of the second link hingedly attaches to the movable platen. The joint between the two links is translated transversely by a drive mechanism such as a lever, hydraulic cylinder, or screw. The drive mechanism attaches near or at the joint. By forcing the joint (elbow) to straighten the double link, the drive mechanism moves the platen into the compression chamber. Likewise, as the joint bends, the distal ends of the first and second links move closer together. However, the distal end of the first link can only pivot at a fixed point, not translate. Therefore, the bending joint retracts the platen from the compression chamber. A double link can provide large longitudinal travel from a short transverse stroke when nearly bent double. High leverage occurs on the platen when the links are nearly extended coaxially. A double link type of four bar linkage allows compact assemblies in much less longitudinal distance than hydraulics alone can.

Expanded polystyrene is especially suitable for the invention due to its ubiquitous use in industrial and consumer applications. Any other polymer material which is subject to mechanical creep may be recycled using the invention if used in sufficient quantity, and if recycling is substantially enhanced by compression at or near the collection point.

The expanded polymer material in the interior of the compression chamber is preferably of approximately uniform size in order to give a uniform density in the compressed product. Particles between 3/8 inch and 2 inches in maximum dimension are preferred, although other sizes can be used effectively. Beads and small chunks of expanded polymers are suitable. Extremely large pieces of expanded polymer may cause density variations across the compressed product.

In practice, the expanded polymer to be compressed is shredded or ground to a preferred maximum dimension and fed into a hopper. The hopper fills the compression chamber from the top. The hopper has a movable wall to prevent bridging of pieces in the hopper. Whenever the first platen is retracted from the compression chamber, the compression chamber fills from the hopper by gravity.

The charge of expanded polymer is compressed by a first platen which moves longitudinally through the compression chamber. The platen crushes the expanded polymer material to a fraction of its original size in the direction of movement. The preferred embodiment of the compression chamber is a rectangular box having three platens which move sequentially. The first and second platens move toward their respective anvils. The third platen moves toward an output port.

A convenient size for the first platen is about 16 inches by 16 inches square having a travel of about 20 inches longitudinally along the approximately 24 inch length of the compression chamber. The second platen descends from the top of the compression chamber and has a dimension of approximately 16 inches by 4 inches. Descending, the second platen further compresses the expanded polymer through a distance of about 12 inches. The resulting block has a width of about 4 inches, a height of about 4 inches, and a length disposed across the compression chamber of about 16 inches.

The third platen moves laterally across the chamber against one 4 inch by 4 inch end of the already compressed densified polymer material. The partially compressed block moves out a port and into a retainer chute already full of previously compressed blocks. Against the frictional resistance of the previously compressed blocks in the retainer chute, the third platen further compresses the expanded polymer in the compression chamber an additional 50 percent. As the charge, originally 16 inches by 16 inches by 24 inches, exits the compression chamber, it has dimensions of approximately 4 inches by 4 inches by 8 inches. The retainer chute is larger than the 4 inch by 4 inch dimension to accommodate restoration of the elastic compression of the block. An appropriate size for the retainer chute is 4½ inches by 4½ inches.

While the block or ribbon of densified polymer material passes through the retainer chute, the retainer chute must have means to permit the escape of trapped air which must diffuse out of the compressed blocks. Also, the length of the retainer chute is sufficient to keep the blocks contained for the requisite time to allow mechanical creep to occur prior to discharge of each block.

Having been restrained for the requisite time for mechanical creep to act and for the gases to escape, a compressed block of expanded polymer exits the retainer chute at 4½ inches by 4½ inches by 8 inches. Often the densified polymer exits the process in discrete 4½ inch by 4½ inch by 8 inch long blocks. The block may bond mechanically to other blocks, forming a continuous filament or ribbon which may be broken or cut to lengths. Blocks are broken or cut from the continuous ribbon for transportation. The blocks can be boxed together for transportation with a preferred density of 25 to 30 pounds per cubic foot. Densities of 60 pounds per cubic foot are possible but not necessary or desirable for economical transportation and handling.

In accordance with the present invention, the apparatus is fabricated of steel for the support of the substantial forces to which each surface of the compression chamber and retainer chute are exposed. The hopper might be made of sheet metal or of plastic or some other material including composite materials.

The apparatus may be manufactured in a variety of embodiments and sizes. An apparatus, including hydraulic cylinders and bracing, may have a footprint the size of a common business desk and may produce a continuous 2 inch or 3 inch square ribbon of compressed polymer.

DETAILED DESCRIPTION OF THE EMBODIMENTS

Figure 1:
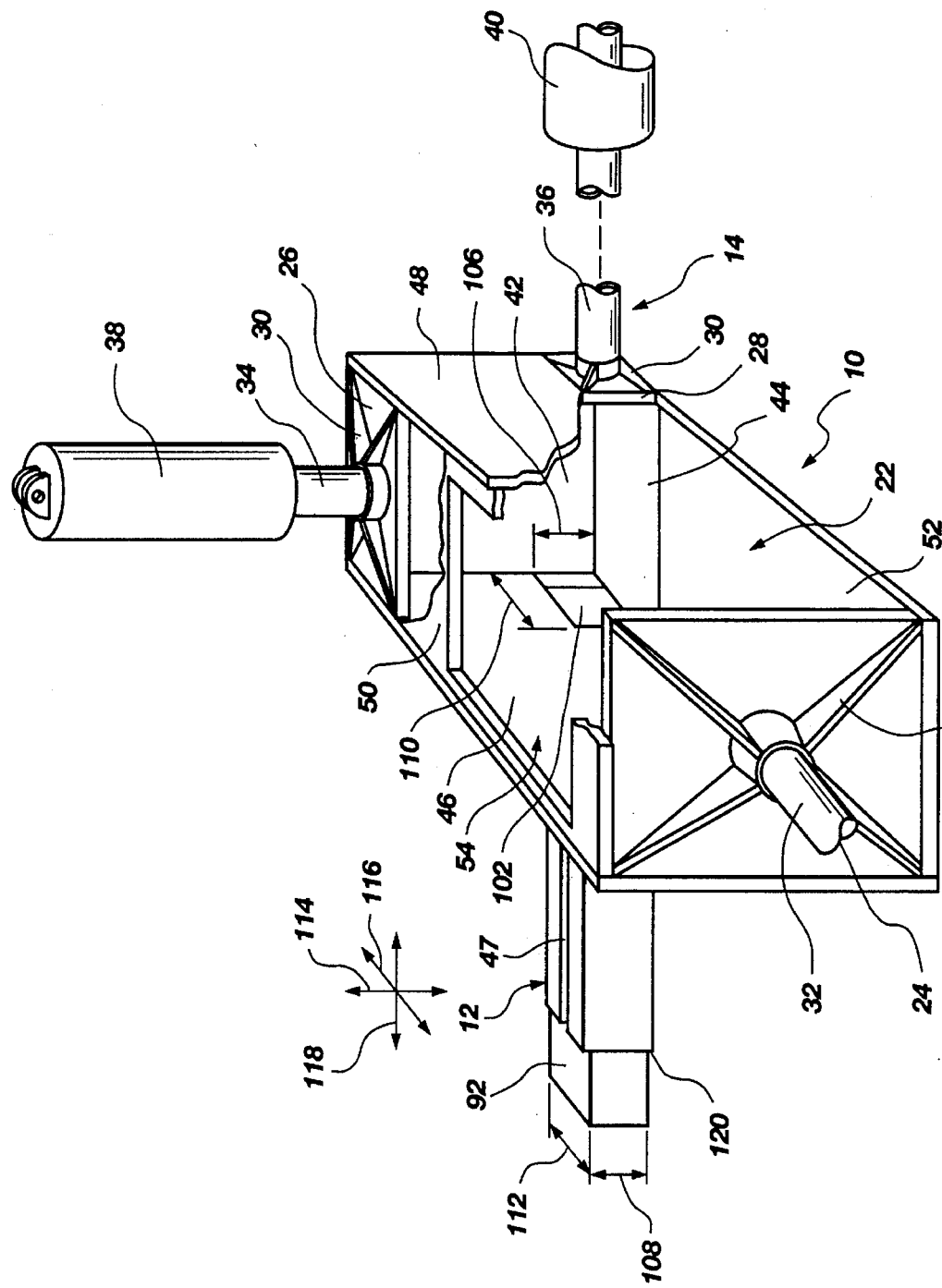
FIG. 1 is a cut-away perspective view of an apparatus for densification of expanded polymer material.
Figure 2:
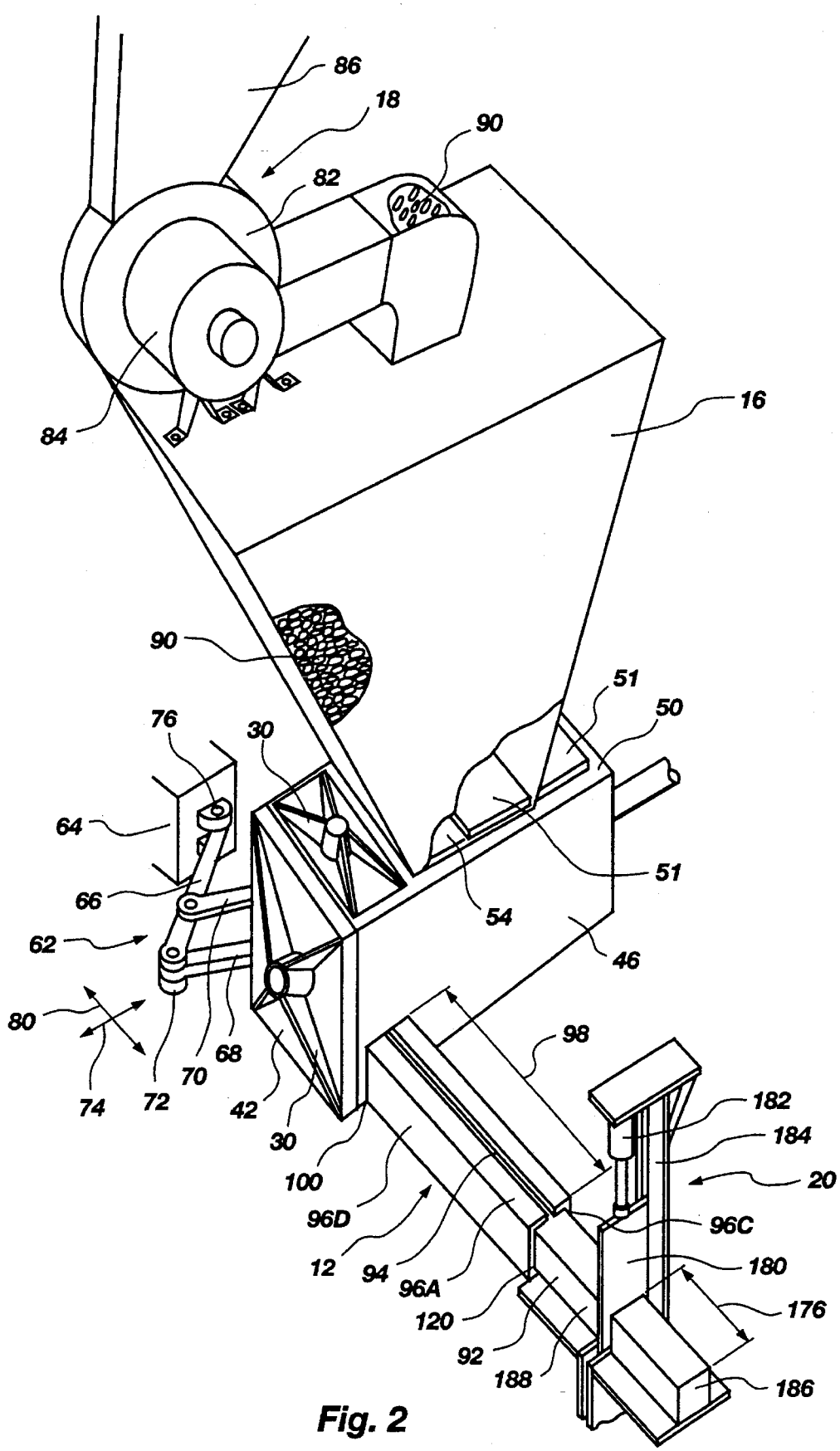
FIG. 2 is a perspective view, partially cut-away, of a system for densification of expanded polymer material, including a hopper and a severance means.
Figure 3:
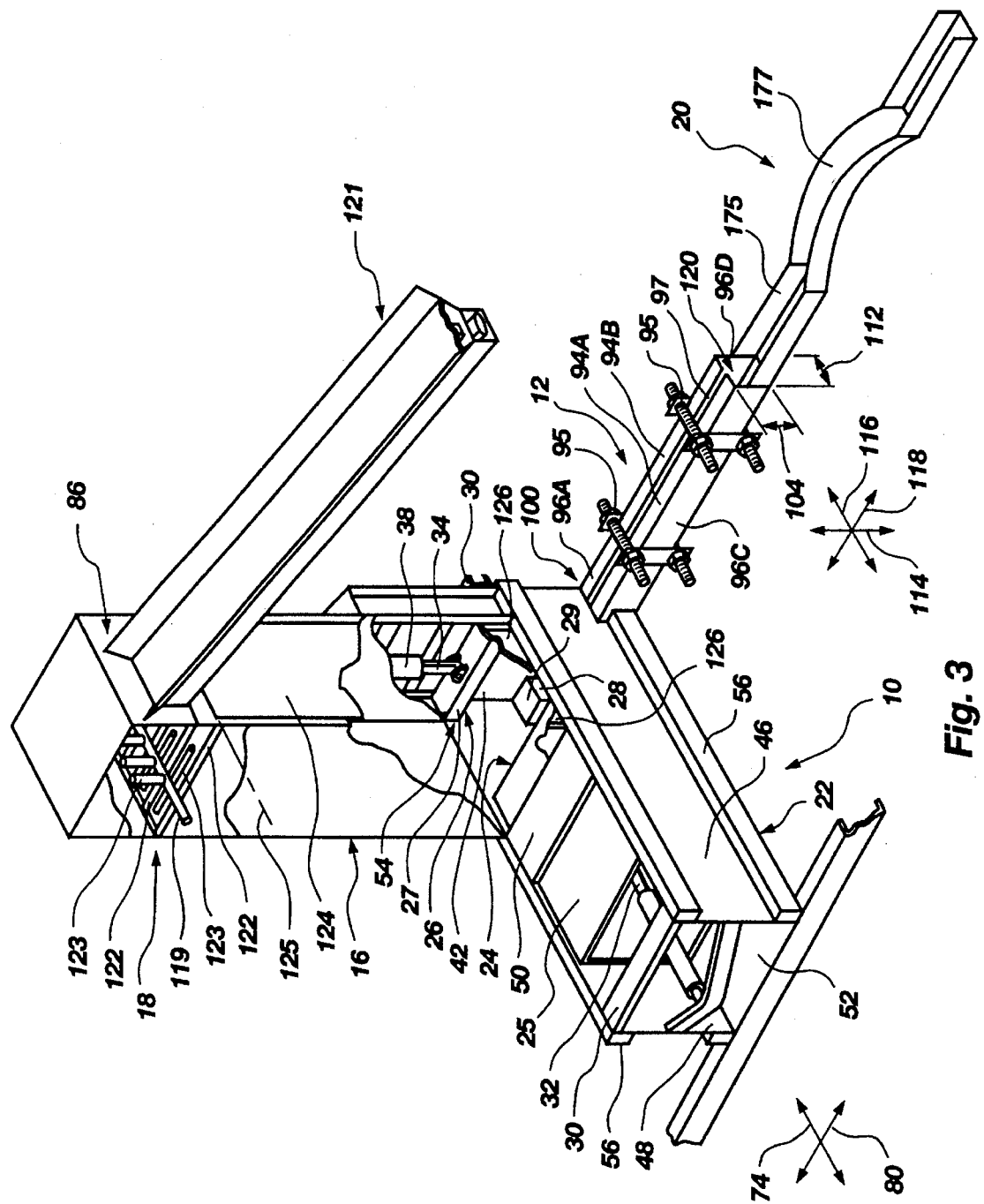
FIG. 3 is a perspective view, partially cut-away, of a prototype system for densification of expanded polymer material, including an integral hopper, shredder and severance means.

The principles and operation of the invention are understood by reference to FIGS. 1–3 which contain cut-away perspective views of preferred embodiments of the invention. A preferred embodiment of the invention is comprised of three main features, a compression chamber 10 which serves as a compression means, an attached retainer chute 12 which serves as a retainer means to maintain compression of the expanded polymer material to be densified, and a discharge mechanism to operate as a discharge means to eject the densified polymer materials from the compression chamber 10 into the retainer chute 12. The discharge mechanism 14 compresses each new charge of densified polymer material against the densified polymer material resident in the retainer chute 12. Thus, the discharge means advances the ribbon of densified polymer material from the retainer chute 12 to the ambient.

In FIG. 2, a system is configured which includes a hopper 16 positioned above the compression chamber 10 to feed expanded polymer material into the compression chamber 10. Uniformity of particle sizes in the expanded polymer material to be compressed results in uniform density of the densified polymer materials. Therefore, a grinder 18, which may work more like a shredder or chopper, is used to cut the expanded polymer material into pieces having a uniform maximum dimension.

Each charge of expanded polymer material which is compressed and discharged into the retainer chute 12 may form a discrete block. If, instead, a charge mechanically bonds to the previous charge during the densification process, it is cut or broken. Usually a bend 177 (see FIG. 3) after the retainer chute 12 will break the densified polymer material into blocks. The length is approximately 8 inches, half the length of the final compression stroke in the instant invention. Otherwise, a severance means 20, different embodiments of which are seen in FIGS. 2–3, may function to sever the densified polymer material from a continuous ribbon into blocks for easy handling.

The compression chamber 10 of FIGS. 1 and 3 is comprised of a pressure box 22 which is preferably a stationary box of strong construction, preferably made of steel. At strategic positions in the pressure box 22, an end platen 24, a top platen 26 and a side platen 28 are positioned such that each may move across a dimension of the pressure box 22. The end platen 24, top platen 26 and side platen 28 are preferably strengthened by ribs 30 to sustain pressures over their large areas. An end shaft 32, fitted to end platen 24 may be driven by a hydraulic cylinder or any other motive means known in the art and suitable to sustain the required forces. Similarly, top shaft 34 and side shaft 36 are driven by top cylinder 38 and side cylinder 40, respectively, to effectuate travel across pressure box 22.

Opposite the end platen 24 and top platen 26 are the end anvil 42 and bottom anvil 44, respectively, each structurally reinforced to support the same loads as the end platen 24 and top platen 26, respectively.

As seen in FIGS. 1–3, 4A, and 4B, a first side wall 46 and second side wall 48 along with a top 50 and bottom 52 form the remainder of the pressure box 22. A feed aperture 54 is formed in top 50 to allow a charge of expanded polymer material to load into the compression chamber 10.

Figure 4A:
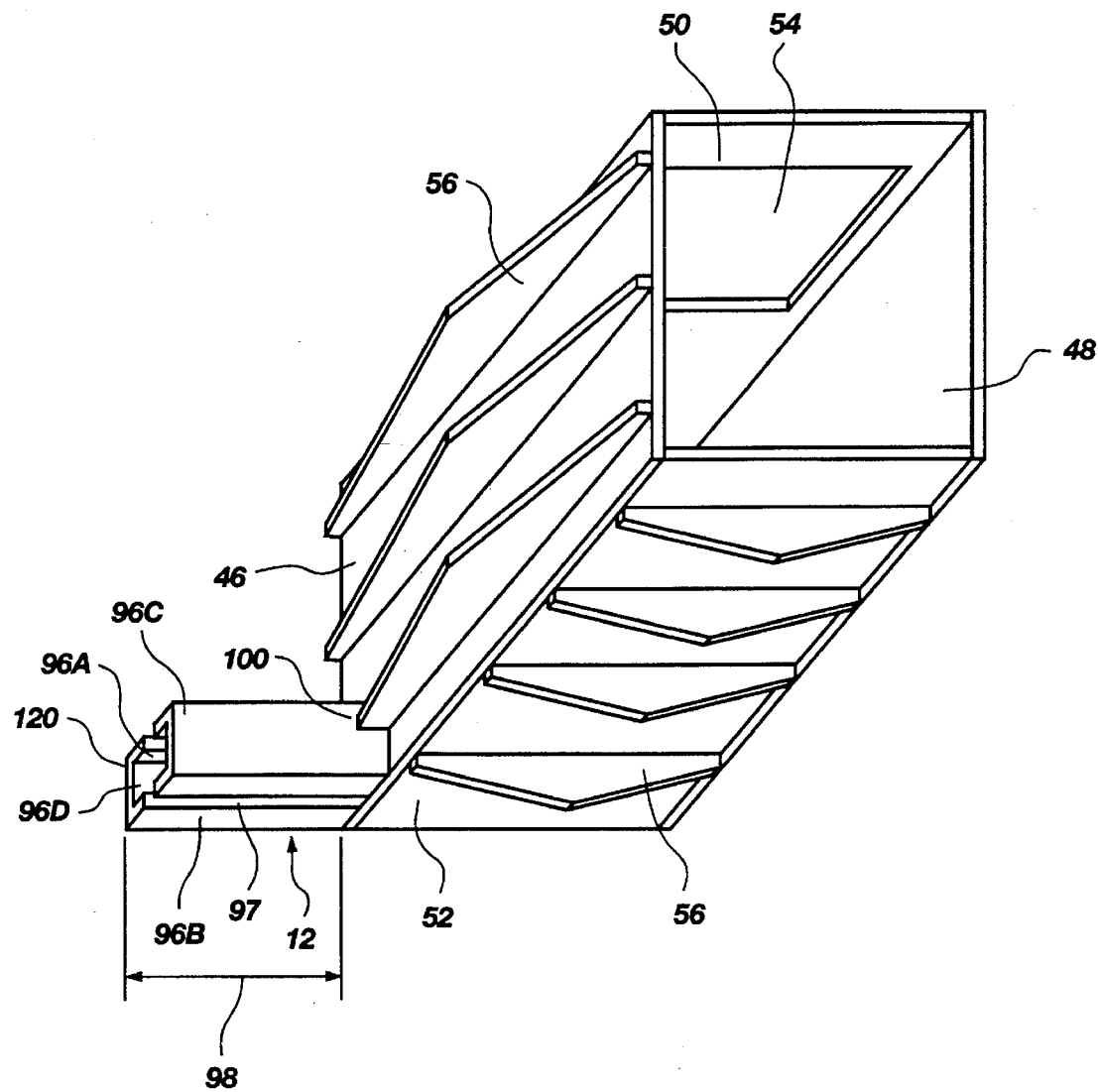
FIG. 4A is a perspective view of one embodiment of the compression chamber and the retainer chute which comprise the compression means and the retainer means of the invention.

Just as the end, top and side platens 24, 26, 28 have ribs 30 for reinforcement, with end anvil 42 and bottom anvil 44 likewise, some reinforcement to other portions of the pressure box 22 are preferred to ensure maximum strength with minimum weight. In FIGS. 3 and 4A, stringers 56 may be secured to first and second side walls 46, 48 and the top 50 and bottom 52 of the pressure box 22 as determined by design criteria such as maximum pressure loads.

End anvil 42, and bottom anvil 44, need not be distinct from the structure of pressure box 22 except that they must be capable of supporting the forces sustained by end platen 24 and top platen 26, respectively. Thus, reinforcement of pressure box 22 in order to form proper surfaces capable of supporting the required pressures may be required.

Figure 4B:
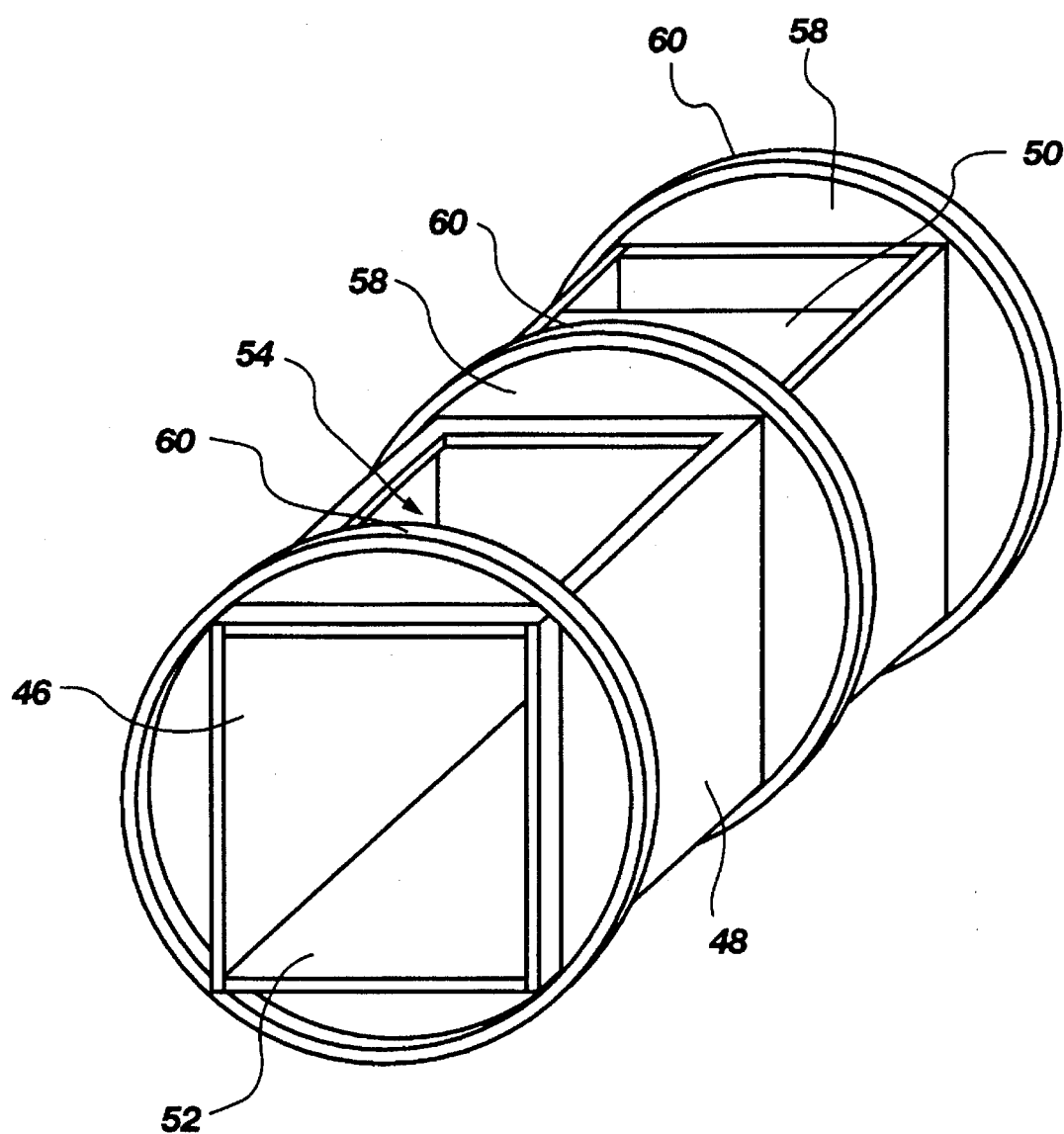
FIG. 4B is a perspective view of an alternate embodiment for a containment means as part of the compression means.

In FIG. 4B, an alternate embodiment for pressure box 22 employs webs 58 in hoops 60 to support the pressures experienced by pressure box 22. Any suitable combination of hoops 60, webs 58 and selected stringers 56 or other framing means may be used to strengthen the weakest locations in pressure box 22. The location of any reinforcing members is dictated by the design criteria for the operation of the compression chamber 10 in which pressure box 22 must function as the principal non-moving structure.

Although top cylinder 38 and side cylinder 40 of FIGS. 1 and 3 are the preferred means for moving top platen 26 and side platen 28, and hydraulics are preferred to move end platen 24 likewise, other mechanisms are suitable. Particularly where pressures are severe and position must be maintained, a four bar linkage 62 (alternately called a sliding linkage or a double link) can create tremendous leverage yet provide a fixed stroke and repeatable positioning.

The mechanics of a four bar linkage involving a sliding member operate as follows. Any fixed member 64 which is rigid with respect to the pressure box 22 of the compression chamber 10 forms one bar of the four bar linkage 62. That fixed member 64 of the four bar linkage 62 slidably receives a sliding member. (The fixed element 64 extends theoretically to infinity to where it shares a center of relative rotation which an actual sliding member, here side platen 28. Here the end, top and side platens 24, 26, 28 slidably move. First link 66 and second link 68 form the other two members of the four bar linkage 62. (In theoretical kinematics one may think of each platen 24, 26, 28 as the proximal end of a lever pivotally secured at an infinitely distant distal end to the earth.)

By attaching a drive link 70 at some point on first link 66, second link 68 or hinge joint 72, the four bar linkage 62 can be driven to move transversely. Drive link 70 can properly be a screw driven shaft, a hydraulic shaft, a lever, a cable or any other means which will function to force the first link 66 and second link 68 to move transversely at hinge joint 72 into and out of axial alignment with each other.

That is, in FIG. 2, drive link 70 must move hinge joint 72 back and forth transversely for itself in the longitudinal direction 74 of the compression chamber 10. As drive link 70 does so, first pivot 76, pivotally connecting first link 66 to fixed member 64 must move with respect to second pivot 78 (not shown) at the distal end of second link 68, second link 68 connects pivotally to side platen 28 in lieu of side shaft 36 of FIGS. 1 and 3. As hinge joint 72 moves in longitudinal direction 74, first pivot 76 and second pivot 78 move away from each other in lateral direction 80.

In other words, hinge joint 72 operates like an elbow between first link 66 and second link 68, such that first pivot 76 operates as a shoulder. Second pivot 78, like a hand and wrist acting on side platen 28, can force side platen 28 across compression box 22 in lateral direction 80 in response to a straightening of the arm (first link 66 and second link 68) when the elbow (hinge joint 72) moves into alignment with first pivot 76 and second pivot 78.

A separate mechanism like four bar linkage 62 could be adapted to move each of the end, top and side platens 24, 26, 28. Four bar linkage 68 is particularly well suited for maintaining high pressures. Properly configured, hinge joint 72 can be moved past a position of alignment with first link 66 and first link 68 and against a stop of any type. It thus "breaks over center" and is stably positioned to remain without hydraulic pumps or other motive means to sustain any pressure which it may be containing in pressure box 22. Moreover, a four bar linkage 62 gives identical travel on every cycle, whereas hydraulic cylinders must usually operate against some mechanism which limits their travel, such as an external stop.

Hopper 16 can be made of any material which is suitable to contain a large volume of expanded polymer material. So long as hopper 16 can properly fill pressure box 22 through feed aperture 54, hopper 16 serves its purpose. In FIG. 2, a grinder 18 comprised of a shredder 82 driven by a motor 84 and fed by a plenum 86 is filled with scrap chunks of expanded polymer material 88 in random sizes. Shredder 82 breaks or cuts expanded polymer material 88 into uniform pieces 90 which are uniform in the sense that they have a uniform maximum dimension. FIG. 3 show the preferred embodiment of grinder 18.

Various configurations of hopper 16 and grinder 18 exist and need not be physically attached to other parts of the invention. High volume production benefits from continuous processes which preferably have numerous pieces of apparatus connected to continuously feed from one to another. Nevertheless, means for cutting, storing and feeding the expanded polymer material into the compression chamber 10 is needed. Each piece of apparatus may be spatially separated from all others. The preferred embodiments of FIGS. 2–3 simply show means for high volume production which may be less desirable in some applications than a simple small hopper 16 attached to the top of compression chamber 10.

In FIGS. 1–3, retainer chute 12 attaches to first side wall 46 of pressure box 22 to receive the densified polymer material 92 forced into the retainer chute 12 by side platen 28. Channel members 94A, 94B of retainer chute 12 are held together by clamps 95 which can be adjusted to control the pressure on densified polymer material 92. Adjustment is shown by threaded members, but could be done by hydraulics or by another powered or automated method. By controlling pressure in retainer chute 12, the clamps 95 control the frictional force acting axially along retainer chute 12.

A gas escape means of suitable size and shape is necessary in the chute walls 96A, 96B, 96C, 96D to allow air to escape from the densified polymer material 92 within the retainer chute 12. In FIG. 3, the retainer chute is preferably constructed to have ventilation slots 97 in chute walls 96A and 96B as the gas escape means.

Retainer chute 12 must be secured to pressure box 22 at an inlet end 100 as seen in FIGS. 2, 3 and 4A since compaction of densified polymer material 92 occurs between side platen 28 and the densified polymer material 92 resident in retainer chute 12. Thus, retainer chute 12 must be secured to the first side wall 46 of pressure box 22 to support the load applied by side shaft 36 driving side platen 28.

In FIG. 2, retainer chute 12, when compared with exit aperture 102 in first side wall 46 of pressure box 22, has a chute height 104 slightly greater than aperture height 106 and a chute width 112 slightly larger than aperture width 110 as seen in FIG. 1. This variation in dimensions allows an elastic expansion of the densified polymer material 92 for a reduction of the ample friction forces in retainer chute 12. Compression of the expanded polymer material by side platen 28 reduces the volume, increasing the density, of the expanded polymer material as it passes into the retainer chute 12 to give a higher density in the densified polymer material 92 than existed within the pressure box 22.

As seen in FIG. 1, and to some extent in FIG. 3, the discharge mechanism 14 is comprised of a side platen 28 driven by a side shaft 36. The side shaft 36 may be driven in turn by a hydraulic pressure of side cylinder 40 or may use a four bar linkage 62 (see FIGS. 1 and 2). The discharge mechanism 14 also requires an exit aperture 102 through which to drive the compressed contents of pressure box 22.

Figure 5:
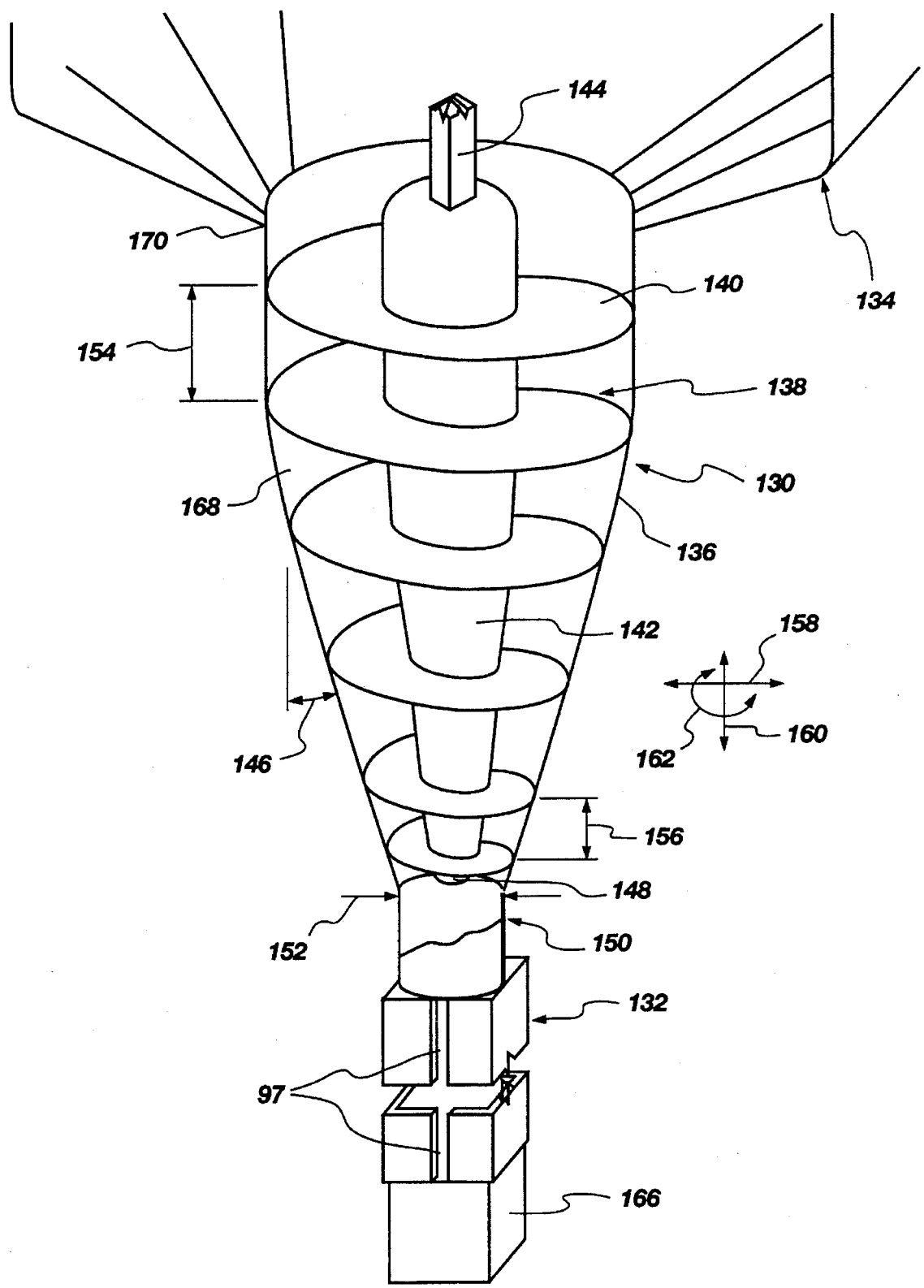
FIG. 5 is a cut-away perspective view of the invention employing an auger-type compression means.

FIG. 5 shows an alternate mechanism to achieve permanent densification of an expanded polymer material 88. The apparatus comprises a compression chamber 130, a retainer chute 132 and a hopper 134. The compression chamber is comprised of a housing 136 surrounding an auger 139 having blades 140 which may be in a single spiral or in multiple spirals. Alternately, two matched augers having interleaved blades may be used, providing a positive displacement for the compression of the expanded polymer material. The blades 140 may be secured to a drum 142, although some augers do not require any structure inside the blades 140. The auger 138 is driven by a drive line 144 which may be turned by any motive means known in the art.

In the preferred embodiment, the auger 138 and housing 136 are fitted together in a taper angle 146 to promote tri-axial compression of the expanded polymer material as it passes through the auger 138. A housing 136 and auger 138 having a taper angle 146 of zero degrees, would be cylindrical. They would function although not as effectively as a tapered auger 138 which provides compression in three directions.

In the preferred embodiment, the tip 148 of auger 138 would not have an obstructing support. Nevertheless, the suspension of augers is well established in the art. Preferably, the exit port 150 which would make a transition between the compression chamber 130 and the retainer chute 132 would be a cylinder of constant diameter 152.

The initial pitch 154, the distance between various revolutions of the blades 140 of auger 138, and the final pitch 156 provide for axial compression. Final pitch 156 is substantially smaller than initial pitch 154. Thus, the taper angle 146 and the difference between initial pitch 154 and final pitch 156 promote tri-axial compression in a radial direction 158, an axial direction 160 and a circumferential direction 162.

Auger 138 feeds expanded polymer material under pressure into exit port 150 which in turn discharges into retainer chute 132 of preferably rectangular cross-section. Ventilation slot 97 allows trapped air to escape as expanded polymer material is compressed to a densified polymer material 166.

For a single auger 138 to operate effectively, the inner surface 168 of housing 136 may have flutes, guides, channels, or some equivalent means to keep the expanded polymer material from rotating with auger 138. A compression means such as end platen 24 in FIGS. 1 and 3 might be adapted to maintain a feed pressure on expanded polymer material at the mouth 170 of housing 136. Because single augers sometimes require some means for positively displacing materials through them, the compression chamber 10 of FIGS. 1 and 3 is the preferred embodiment. Augers are used extensively in the polymer processing industry and represent one feasible means to feed an expanded polymer material into retainer chute 132 for permanent densification.

Returning to FIGS. 1–3, end platen 24 may be cycled, that is moved toward end anvil 42 followed in turn by top platen 26 moving toward bottom anvil 44 and side platen 28 moving toward exit aperture 102. The result is compression along three axes defined by the travel directions each of the aforementioned platens 24, 26, 28. However, the auger 138 of FIG. 5 is a movable member which may achieve tri-axial compression by virtue of geometry and the compression chamber 130. Nevertheless, the apparatus of FIG. 5 operates with retainer chute 132 which is critical to the invention. Retainer chute 132 of FIG. 5 and retainer chute 12 of FIGS. 1 and 3, operate to confine the densified polymer material 166 and 92, respectively, in three dimensions.

Figure 6:
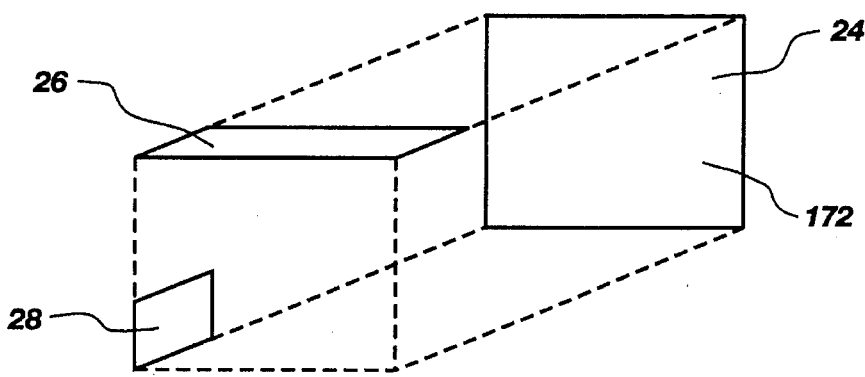
FIG. 6 is a schematic showing the position of all platens prior to compression.

Returning to the apparatus of FIG. 1, the FIGS. 6–9 show the relative positions of the end, top and side platens 24, 26, 28 in operation. The apparatus of FIG. 3 operates similarly, but side platen 28 cycles in the opposite direction. Also, rams 25, 27 and 29 are configured to support end top and side platens 24, 26 and 28, respectively. More differences between the apparatus of FIG. 1 and FIG. 3 are discussed below. Referring to FIG. 6, end platen 24 is viewed from its face 172. With no intrusions into the pressure box 22, (shown in phantom in FIGS. 6–9) expanded polymer material can feed through feed aperture 54 in the top 50 of pressure box 22, filling pressure box 22.

Figure 7:
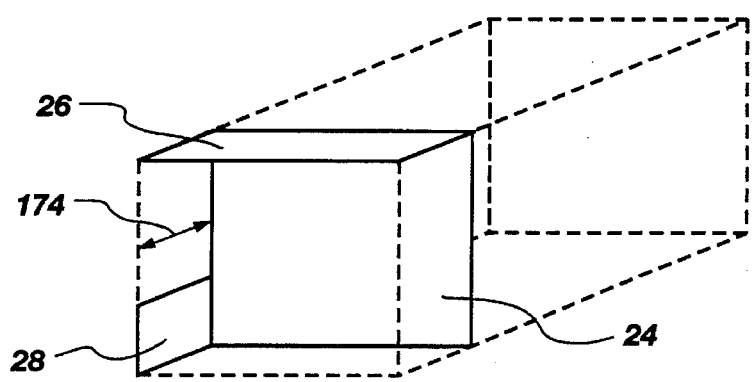
FIG. 7 is a schematic showing the position of all platens after the first compression, by the end platen.
Figure 8:
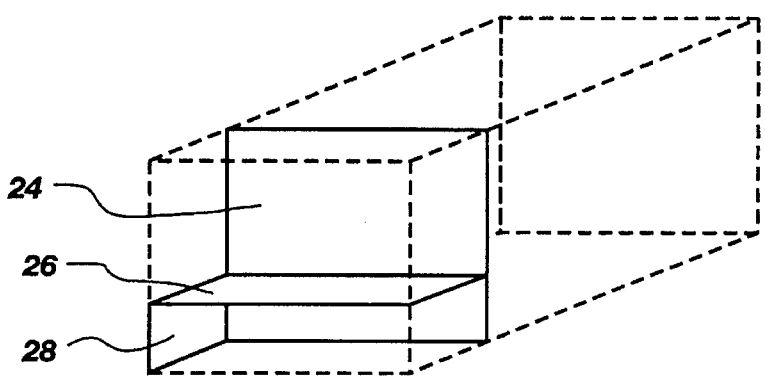
FIG. 8 is a schematic showing the position of all platens after the second compression, by the top platen.

In FIG. 7, end platen 24 has moved, compressing the contents of pressure box 22 into a reduced volume defined by the aperture width 110 which matches the side platen width 174 of side platen 28. End platen 24 remains in the position shown in FIG. 7 as top platen 26 drives downward to the position shown in FIG. 8. The contents of pressure box 22 are now confined to a brick shape described by end platen 24 opposite end anvil 42, top platen 26 opposite bottom anvil 44, and side platen 28 opposite the densified polymer material 92 compacted in exit aperture 102.

Figure 9:
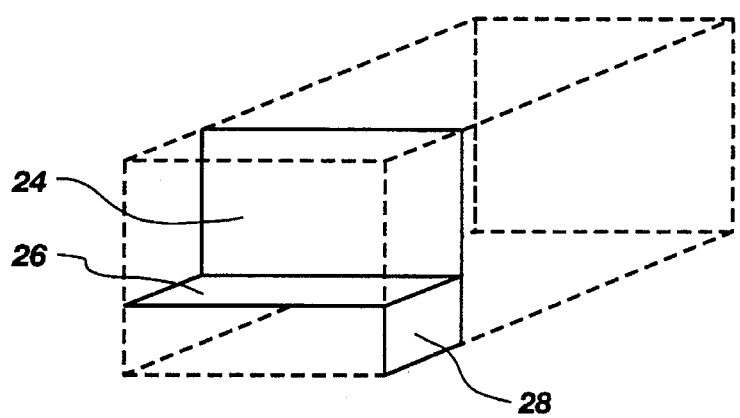
FIG. 9 is a schematic showing the position of all platens after the third compression, by the side platen, discharging the compressed polymer material from the compression chamber.
Figure 10:
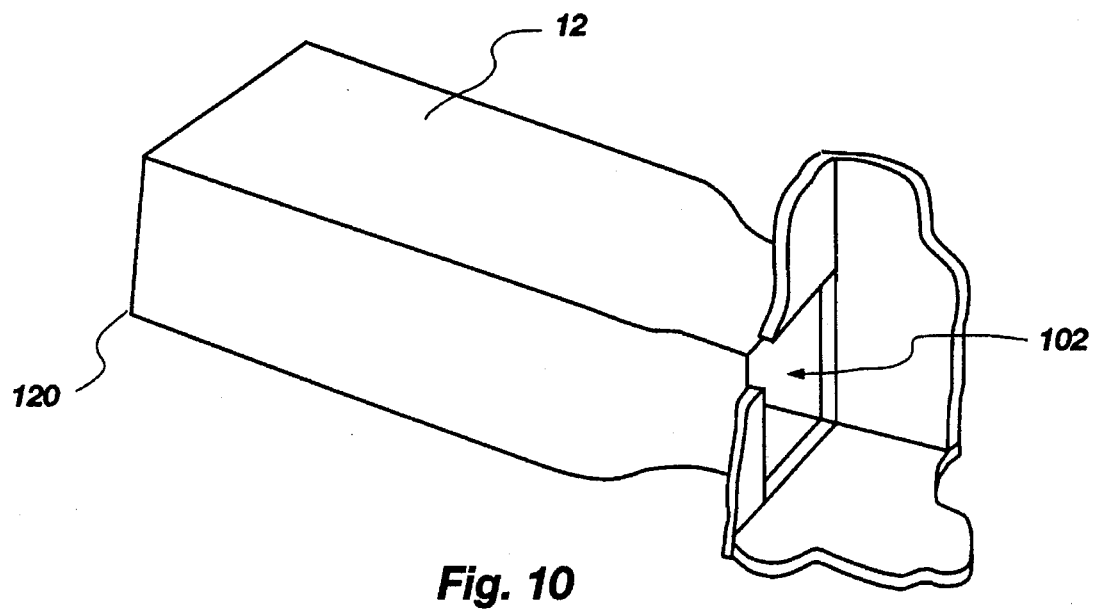
FIG. 10 is a cut-away perspective view of the retainer chute showing one means of expanding two dimensions of the retainer chute to reduce friction on the walls and to prevent backward expansion of the densified polymer material.
Figure 11:
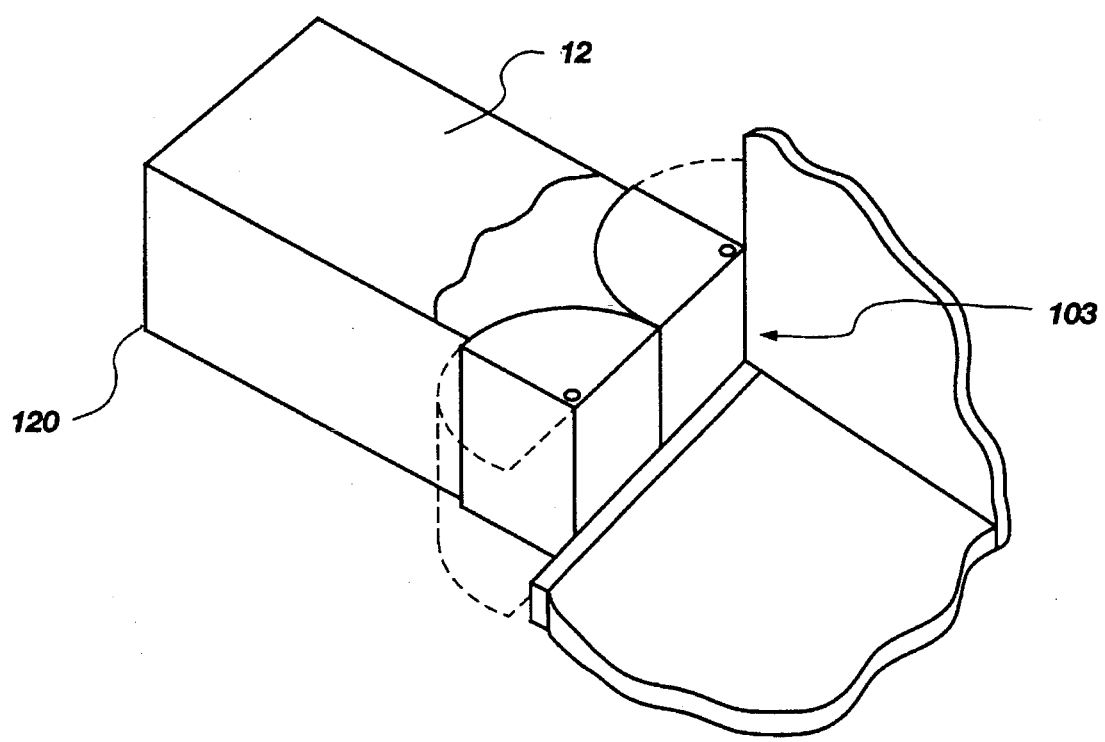
FIG. 11 is a cut-away perspective view of an alternate means to gate the retainer chute from the exit wall of the compression chamber.

As side platen 28 moves to the position shown in FIG. 9, it sweeps clear the last volume of pressure box 22. By forcing the expanded polymer material into retainer chute 12, side platen 28 further compresses the expanded polymer material to a densified polymer material 92. Since the aperture height 106 and aperture width 110 are slightly smaller than the chute height 108 and chute width 112 respectively, as shown in FIG. 10, the densified polymer material 92 will elastically expand slightly in a chute vertical direction 114 and chute lateral direction 116 while being further compressed in the chute axial direction 118 shown in FIGS. 1 and 3. The net effect on densified polymer material 92 is a length decrease of 50 percent in the chute axial direction but net decrease in volume of approximately one-third for a density increase of approximately 50 percent.

Densified polymer material 92 is the compressed product discharged from the invention. Although the densified polymer material 92 continues to increase in density throughout the operation of the invention, the density does not change dramatically after discharge from the compression chamber 10 of the invention. Thus it is proper to discuss the densified polymer material 92 after discharge from the compression chamber, even though at each stage of the process of the invention, the expanded polymer material is pressed to a densified state above the density it previously had until discharged.

The chute walls 96A, 96B, 96C, 96D, have frictional contact with the densified polymer material 92 passing through the retainer chute 12. Thus, the densified polymer material 92 experiences a frictional resistance force which resists any movement of side platen 28 trying to force the expanded polymer material 88 through exit aperture 102 into retainer chute 12.

Retainer chute 12 might also have a slight taper along chute length 98, thus narrowing toward retainer exit port 120. In the preferred embodiment, frictional resistance between the densified polymer material and the retainer chute 12 is sufficient with a constant cross section to maintain compression in the longitudinal direction.

In FIGS. 1–3, a double channel configuration is used. The channel members 94A, 94B may be held together by an adjustable force imposed by clamps 95. Lateral force can be controlled by squeezing the retainer chute 12 to increase friction. Using a spring or hydraulic force to maintain constant lateral force will control axial frictional force. Axial frictional force will then control density of the densified polymer material 92 in the retainer chute 12.

Referring to FIGS. 1 and 3, the densified polymer material 92, with each cycle of the side platen 28, advances inside retainer chute 12. By the time densified polymer material 92 has exited the retainer port 120, it is formed into a continuous ribbon of permanently stable dimensions complying approximately with chute height 108 and chute width 112.

After exiting the retainer chute 12, the densified polymer material 92 passes into a tray 175 having a bend 177. (See FIG. 3) The continuous ribbon of densified polymer material 92 is preferably broken to substantially uniform lengths 176 equal to one charge of compression chamber 10. Otherwise severance of individual blocks from the ribbon-like densified polymer material 92 may be done by a cutter 178.

For example, a guillotine blade 180 driven by hydraulic cylinder 182, with both hydraulic cylinder 182 and guillotine blade 180 being suitably secured to the frame 184, may effect the severance of block 186 from continuous ribbon 188 of densified polymer material 92. Uniform length 176 of block 186 can be any appropriate value for easy handling and loading but breaks naturally at about 8 inches in the embodiment of FIG. 3. Likewise, cutter 178 can be a saw, a hot electric knife or various other mechanisms known in the art of polymer processing.

The embodiment of FIG. 3 shows additional features over the embodiments of FIGS. 1 and 2. For example, a conveyor 121 feeds expanded polymer material 88 into plenum 86, opening into hopper 16. A grinder 18 is comprised of a grate 122 through which rotate the tines 123. A motor rotates the tine shaft 119 to which the tines 123 are fixed. The conveyor 121 may deliver large pieces of expanded polymer material 88 of any size which will fit into plenum 86. The tines 123 force any large pieces of expanded polymer material to break up in order to pass through the grate 122 into hopper 16.

Hopper 16 in the embodiment of FIG. 3 is of substantially the same cross section as the feed aperture 54 into pressure box 22. Feed aperture 54 may operate with no closure, relying on the expanded polymer material to remain stable as the end platen 24 compresses it.

Stability of the expanded polymer material may be desirable in the compression chamber 10 during compression, but not in the hopper 16 during charging of the compression chamber 10. Hopper 16 has a movable wall 124 which pivots about a wall axis 125, thus allowing the wall lower end 126, located opposite the wall axis 125 to move outwardly to relieve any binding of expanded polymer material 88 during charging. A hydraulic cylinder (not shown) is used to actuate the lower wall end 126. After charging, the wall lower end 126 swings inward resulting in a slight taper, holding and stabilizing the expanded polymer material in the hopper 16.

The operational sequence of the apparatus of the instant invention may be made continuous and automatic. Unattended operation is inherent in the controls available for the hydraulic systems involved. Thus the end platen 24, top platen 26 and side platen 28 can operate continuously in sequence. Likewise, properly controlled, conveyor 121 and grinder 18 can operate continuously to keep hopper 16 filled. A continuous supply of blocks of densified polymer material 92 may be discharged into a bin, container, or vehicle in a size suitable for handling.

In discussing the high density of the densified polymer material 92, one should understand that "high density" is not necessarily a constant density. That is, with each cycle of the compression chamber 10, the densified polymer material 92 continues to decrease in volume, increasing in density.

Nevertheless, the high density does not change its order of magnitude after entry into the retainer chute 12. Nevertheless, the density may change approximately one less order of magnitude than its value upon entry into the retainer chute 12. Thus, it is proper to speak of the "high density" condition as that after discharge of the densified polymer material 92 from the compression chamber 10. The retainer chute 12 primarily renders the change in density permanent by maintaining the dimension of the densified polymer material 92 over a period of time in which creep and gas diffusion processes can operate.

Expanded polymer materials are formed as liquids which are aerated or gasified to contain numerous tiny bubbles of gas, each surrounded by a cellular wall of polymer. The polymer is cured in this cellular construction to form a styrofoam, urethane foam, foam rubber, etc. Foamed products are common and can be formed of a variety of polymers. In the instant invention, the most suitable polymer for use in the apparatus disclosed is expanded polystyrene, commonly called styrofoam. The structure of polystyrene is relative strong, rigid, and, in the expanded polymer material, is lightweight. That is, styrofoam contains substantial quantities of trapped gases in its cellular structure.

Substantially all gas is released from the expanded polymer material by the instant invention. By substantially all is meant that only some nominal small percentage remains. Since the instant invention can reduce the volume of expanded polymer materials by more than 95 percent, a corresponding fraction of the gases contained in the cellular structure of the expanded polymer material must be driven off.

In summary, expanded polymer material 88 enters the plenum 86 (see FIGS. 1–3 where similarly functioning parts are numbered the same) from which it feeds into shredder 82. Shredder 82 discharges uniform pieces 90 into hopper 16. Uniform pieces 90 of expanded polymer material substantially fill compression chamber 10 as defined by pressure box 22, end platen 24, top platen 26 and side platen 28. Hopper gate 51 may act to seal feed aperture 54. Hopper gate 51 is not required in the apparatus of FIG. 3, but may prevent the expanded polymer material 88 from returning into the hopper 16 through feed aperture 54 when the end platen 24 begins to move through its stroke.

Once charged with expanded polymer material, the compression chamber 10 begins to reduce the volume of the expanded polymer material by the movement of end platen 24 toward end anvil 42. As end platen 24 comes to a halt next to side platen 28 and top platen 26, top platen 26 drives downward under the load of top shaft 24 driven by top cylinder 34. Top platen 26 comes to a halt just above side platen 28. Depending on pressures used, the apparatus and process may be configured to wait for some time period after each platen moves before the next platen moves. Likewise, a platen may operate to maintain a pressure, rather than a position for a time specified. In the preferred embodiment, no delays occur, and the cycle is continuous.

Side platen 28 drives toward exit aperture 102 under the power of side shaft 36 powered by side cylinder 40. As each of the end platen 24, top platen 26 and side platen 28 return to their original positions approximately flush with the inside surfaces of pressure box 22, the compression chamber 10 has operated through one cycle which may be repeated continuously.

In the preferred method of operation of the invention, density is not allowed to decrease once operation begins. Due to design considerations, the density of the expanded polymer material as it is driven into the retainer chute 12 through exit aperture 102 in pressure box 22 might momentarily decrease as the densified polymer material 92 expands in the direction of chute height 108 and chute width 112 which are larger than aperture height 106 and aperture width 110, respectively. Nevertheless, because of the compression induced by side platen 28, the effective density of densified polymer 92 as soon as it is discharged from compression chamber 10 is higher than the maximum density of the expanded polymer material at its most confined position in compression chamber 10.

This process of monotonic compression is important. That is, others have attempted to compress expanded polymer materials by using rams or platens to collapse the contents of a compression chamber. However, by using repeated charging, compression and release, without extracting the compressed product from the compression chamber, densification devices have several difficulties. First, gases captured within the cellular structure of the expanded polymer materials compress and expand with the application and release of compressive forces, thus tending to expand the expanded polymer material back to its original shape every time the compression forces are released. Secondly, no time, reduced dimensions or ventilation means are provided to allow for efficient escape of captured gases. Compressive loads are not maintained under circumstances which drive gases from the cellular structure of the expanded polymer material. Third, creep is a time dependent phenomenon in which stress and duration are critical.

In the instant invention, the compressive load is not retired from the expanded polymer material except by the creep of the polymer material to conform to a smaller dimension. Thus, in the instant invention compression is monotonic. The compression preferably only goes in one direction, to smaller volume and higher density at every step. Moreover, most other devices provide only uniaxial compression. The instant invention is much more effective in inducing creep and much more efficient in achieving high, permanent percentages of density increase using tri-axial compression by three orthogonal platens.

Because the chute height 108 and the chute width 112 are larger than aperture width 110 and aperture height 106, the densified polymer material 92 in retainer chute 12 cannot re-expand back into the interior of pressure box 22. That is, a certain amount of compression in densified polymer 92 is elastic compression which is not eliminated by mechanical creep. The majority of compression of expanded polymer material into densified polymer material 92 is reversible elastic compression and irreversible inelastic compression made permanent by the action of mechanical creep.

Another portion of the densification process is driving out a majority of the captured gases which formed the foam-like structure initially. During the compression process within compression chamber 10, much of the gas is simply pressurized within small cells within the polymer material. However, with time, under pressure, the captured gas escapes from the expanded polymer material which becomes densified polymer material 92 and diffuses outward to escape through ventilation slot 97. Thus, densified polymer material 92, upon exiting retainer chute 12, substantially maintains the dimensions it had while inside the retainer chute 12.

By releasing the expanded polymer material from all constraints, or by discharging the densified polymer material to ambient, the mechanical constraints used to induce creep in the expanded polymer material are removed leaving only a block of densified polymer material with no dimensional constraints upon it. In the prior art, baling is common. It introduces additional materials, additional process steps, non-uniform forces, and a potentially harmful expansive bale. By contrast, the instant invention provides blocks which are dimensionally stable without binders, packaging, or any other permanent confinement. Moreover, the densities achieved in the instant invention are substantial. Densities of 60 pounds per cubic foot are possible for styrofoam densified by the instant invention, although requiring the expenditure of significantly more energy than densification to 25–30 pounds per cubic foot. However, for optimum transportation and handling, a density between 25 and 30 pounds per cubic foot is preferred.

The mass of a material per unit of volume occupied by the material is the density of the material. Thus, one can speak of reduced volume and increased density interchangeably. Thus, the instant invention performs densification of an expanded polymer material by reducing the volume of the expanded polymer material. Preferably, volume is reduced monotonically and tri-axially in the most effective embodiment. Obvious variations of the apparatus and process for reduction of volume for a preselected time are comprehended within the scope of the invention, however, whether or not the reduction is monotonic or tri-axial.

Figure 12:
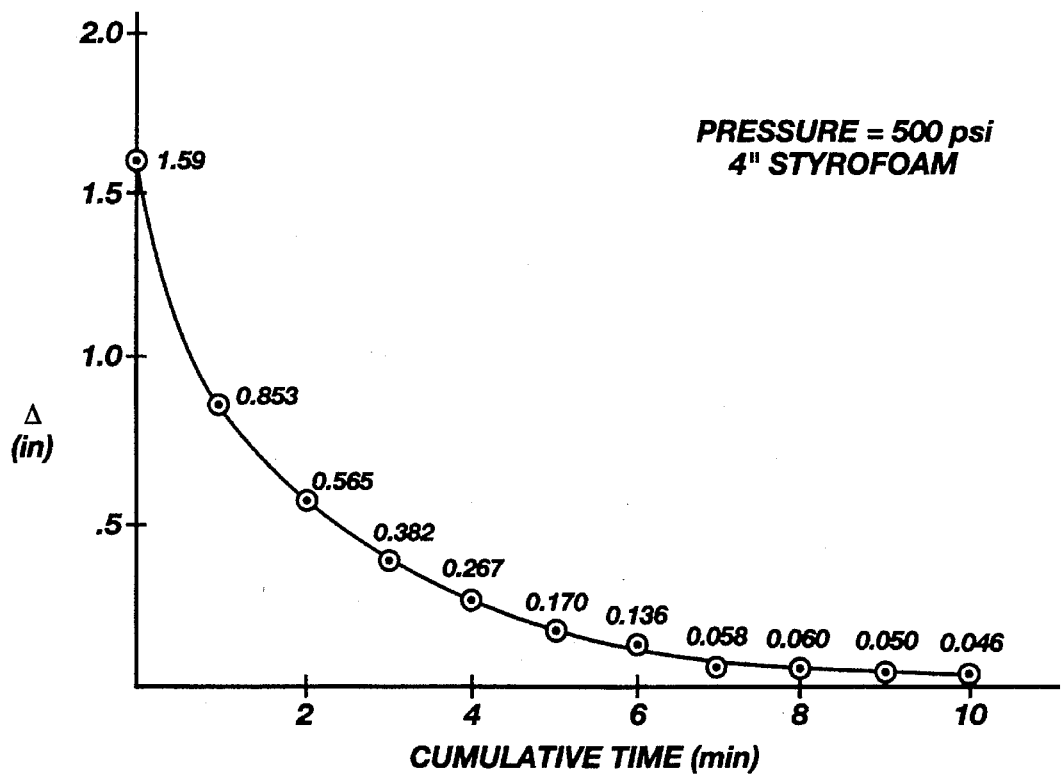
FIGS. 12–15 are charts showing the change in height experienced by a four-inch-high specimen of styrofoam upon removal of a crushing load after retention under the crushing load for various periods of time at the pressures shown.

FIGS. 12–17 show the effect of compression of expanded polymer materials. FIG. 12 shows the change in height of a 4-inch thick block of expanded polystyrene (styrofoam) maintained under a 500 psi pressure for a period of time measured in minutes. Following an initial rapid change in height, the compressed styrofoam stabilizes at a small dimension.

Figure 13:
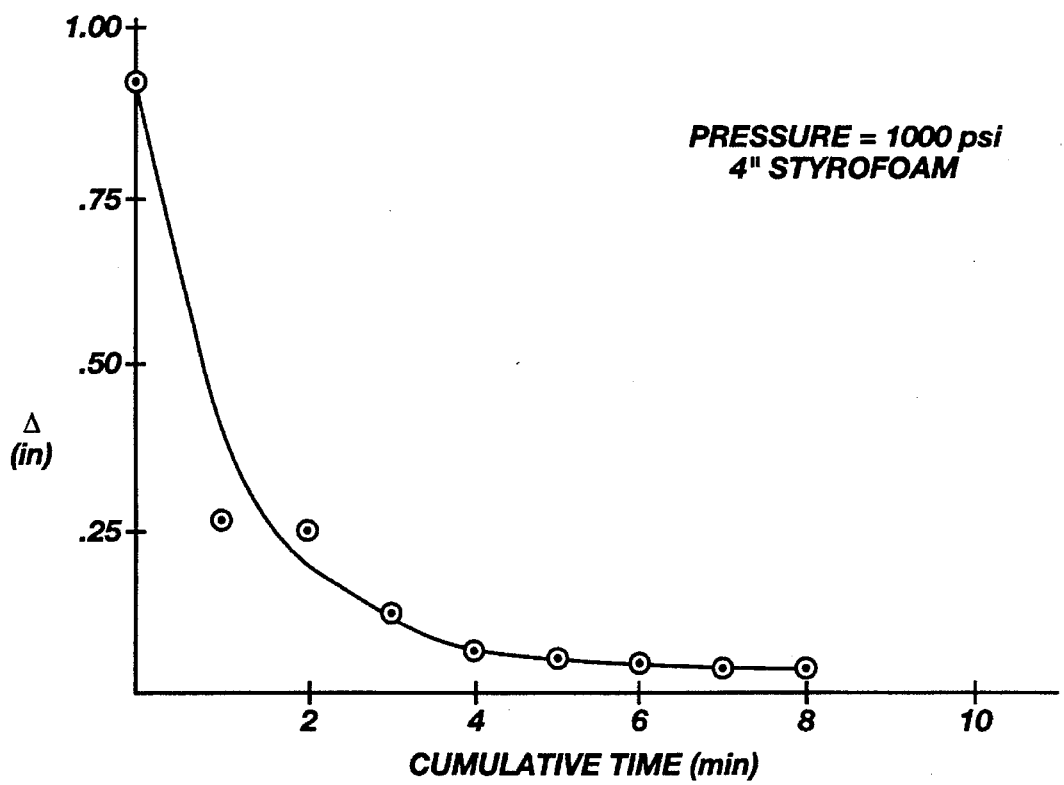
Figure 14:
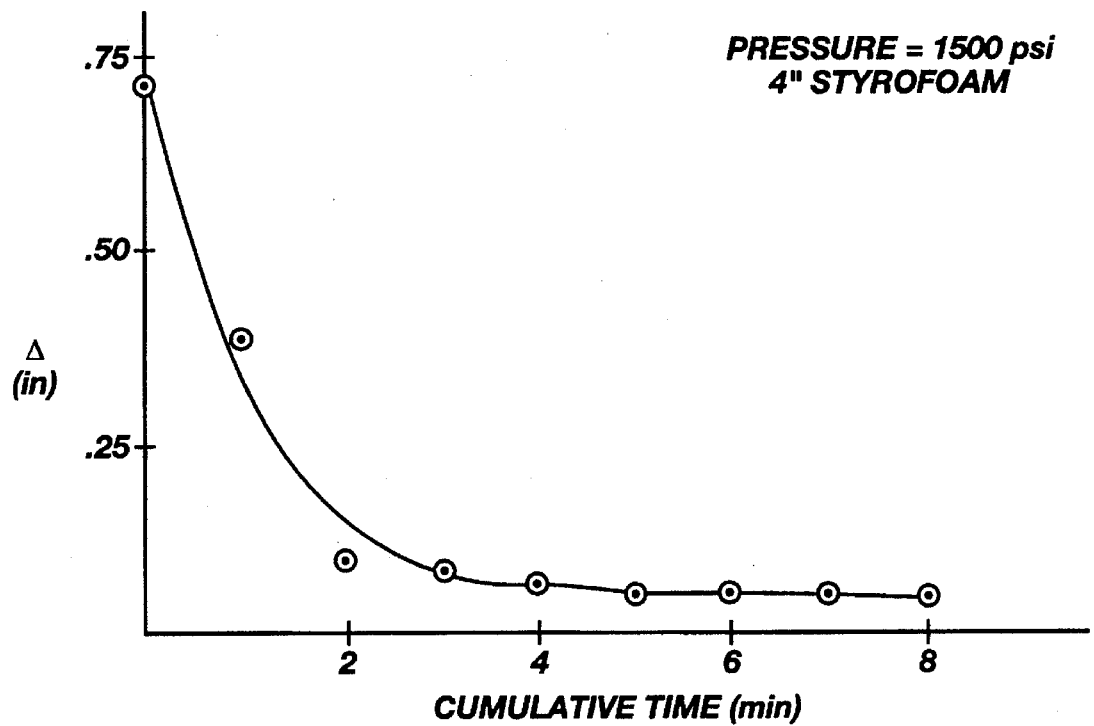
Figure 15:
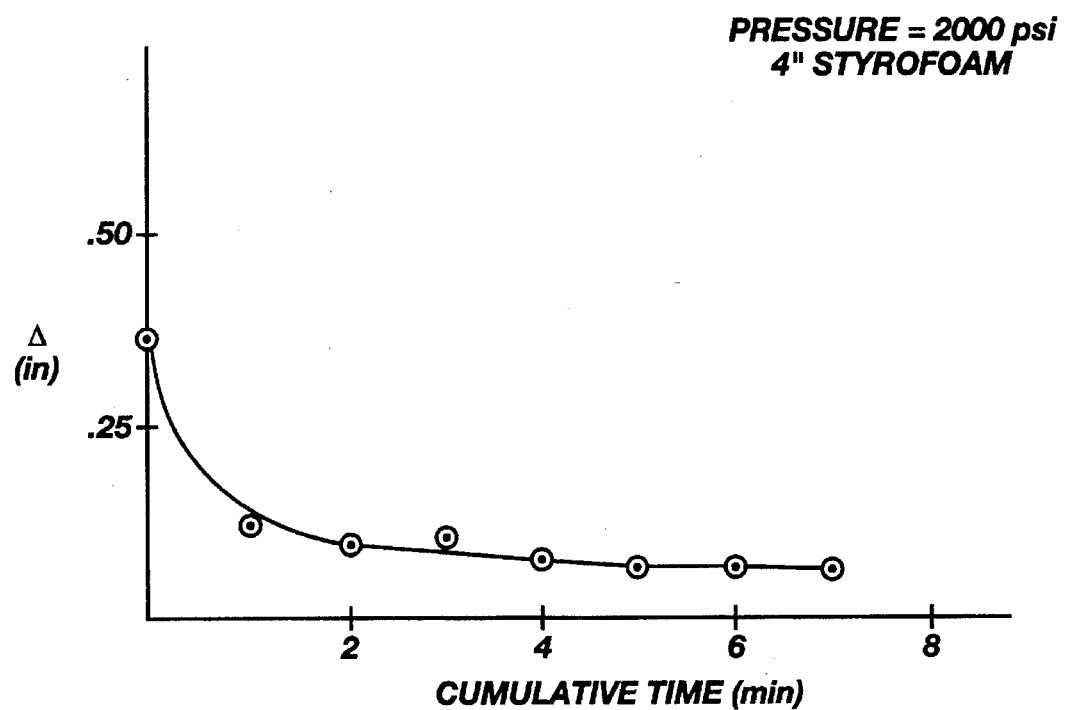
Figure 16:
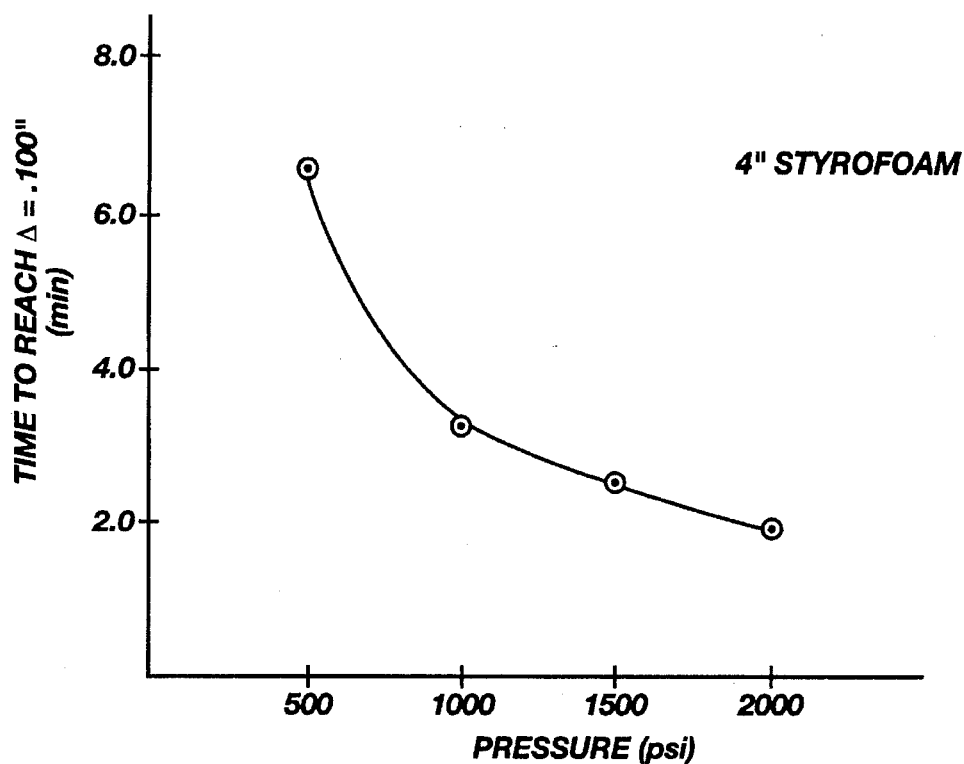
FIG. 16 is a chart showing the time required to reduce height recovery to less than 0.100 inch in a 4 inch layer of styrofoam compressed at various crushing pressures.

FIG. 13 shows the compression of a similar 4-inch styrofoam block under a pressure of 1,000 psi over a period of eight minutes. FIGS. 14 and 15 show data for the same type of sample at 1,500 psi and 2,000 psi respectively. FIG. 16 compares the time after which a 4-inch styrofoam block upon release of pressure will deflect less than 0.100 inches.

In the charts of FIGS. 12–15, the vertical axis is a measure of the recovery distance of a 4-inch styrofoam block crushed under the load indicated. Thus the difference, delta, between a compressed condition and a released condition indicates the relative proportions of inelastic creep and elastic compression. As potential creep decays to almost zero, a higher percentage of the recovery is attributable to elastic compression which is recoverable. Thus, FIG. 16 shows that time and pressure can be traded off to achieve similar results in the expanded polymer material.

Figure 17:
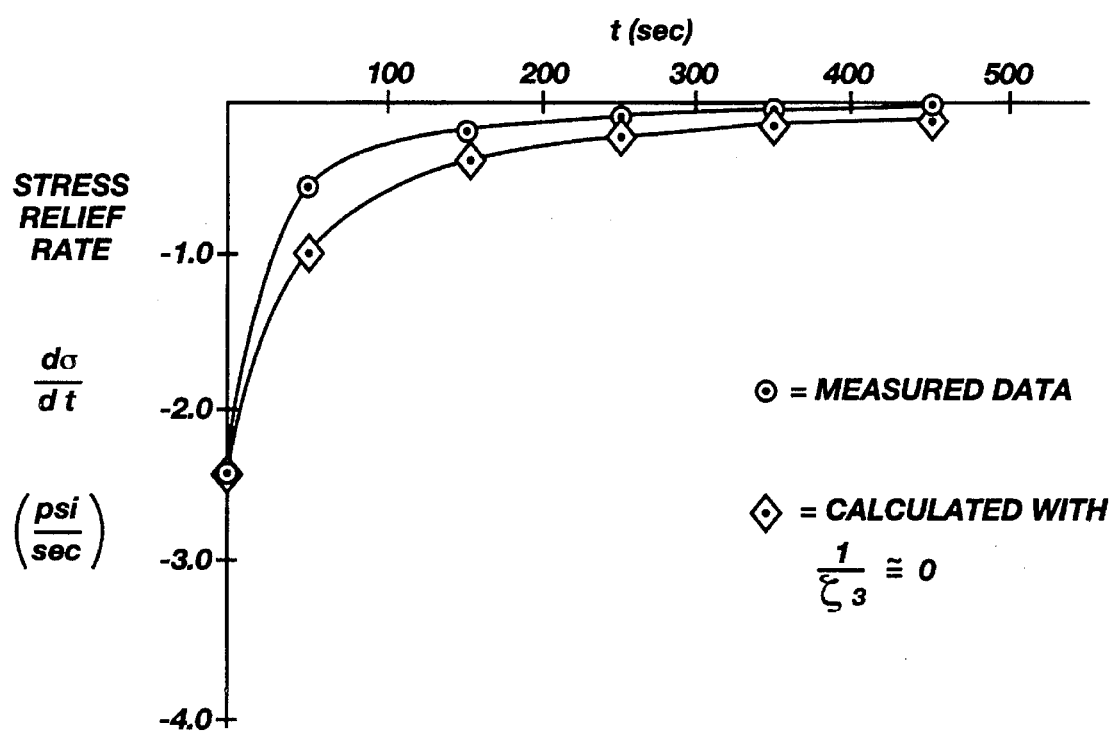
FIG. 17 is a chart showing the reduction in the rate of stress relief (pounds per square inch per second) in a restrained sample under viscoelastic creep conditions. Also called mechanical creep, the result is compared to a hypothetical sample having a timed load applied for a million pound seconds per square inch ($10^6$ psi-sec), infinity for most practical purposes.

FIG. 17 plots the rate of stress relief, in pounds per square inch per second over a period of time in a styrofoam sample. Due to the presence of a pressure on a sample over a period of time, a sample takes on a permanent set during to the creep process. As creep continues, the inelastic portion of the viscoelastic recovery becomes less. When the inelastic portion of deflection, as shown by the points surrounded by diamonds, experiences a very high load for a very long time, corresponding to sufficient load and time for substantially all creep to occur, then the rate of stress relief (rate of change in pressure) with time tends toward zero in the chart. The experimental data shown by the points surrounded by circles demonstrates that the test data of FIGS. 12–16 represent the permanent deformation of the expanded polymer material, which permanent deformation could only be slightly changed at a very slow rate if loaded for an infinite period of time.

The principles of the instant invention may be practiced by various modifications to the apparatus and method shown. Thus the invention is not limited to the embodiments disclosed but anticipates modifications as would be known by those of ordinary skill in the art.

We claim:

1. A method for densification of expanded polymer material, said method comprising the steps of:

compressing expanded polymer material in bulk from an original density to a block of material having a higher density;

discharging said block of material in a densified condition to a retention location;

maintaining said block of material at said retention location in substantially said densified condition for a preselected time, said preselected time being selected to be sufficiently long to permanently conform said expanded polymer to substantially said densified condition by action of mechanical creep in said expanded polymer material;

degassing said block of material while retained in said densified condition; and discharging said block of material in said densified condition to ambient, said block of material permanently conforming to substantially said densified, degassed condition.

2. The method of claim 1, wherein said expanded polymer material in bulk has a first axis, a second axis and a third axis and wherein said step of compressing said expanded polymer material is further comprised of:

compressing said expanded polymer along said first axis to a first intermediate density;

compressing said expanded polymer material along said second axis to a second intermediate density; and compressing said expanded polymer material along said third axis to a third density.

3. The method of claim 1, wherein said expanded polymer material is expanded polystyrene and said higher density is a permanent unrestrained density of greater than 20 pounds per cubic foot in said expanded polystyrene.

4. The method of claim 1, wherein said preselected time corresponds to substantial cessation of said mechanical creep.

5. The method of claim 1, wherein said step of discharging said expanded polymer material includes the step of discharging said expanded polymer material from external constraints on said density.

6. The method of claim 1, wherein said preselected time is greater than 8 minutes, and the ratio of said higher density to said original density is greater than 50:1.

7. The method of claim 1, wherein said preselected time is greater than 5 minutes and the ratio of said higher density to said original density is greater than 40:1.

8. The method of claim 1, wherein said preselected time is greater than 4 minutes and the ratio of said higher density to said original density is greater than 20:1.

9. The method of claim 1, wherein said step of maintaining said higher density for a preselected time further comprises the step of applying pressure to said expanded polymer material.

10. The method of claim 9, wherein said compressive pressure is initially between 2000 psi and 100 psi and said preselected time is between 2 minutes and 20 minutes.

11. The method of claim 9, wherein said pressure decays by 50 percent between an initial value and a final value.

12. The method of claim 9, wherein said pressure is initially 500 psi and said preselected time is greater than 5 minutes.

13. The method of claim 9, wherein said pressure is initially 1000 psi and said preselected time is greater than 3 minutes.

14. The method of claim 9, wherein said pressure is initially 1500 psi and said preselected time is greater than 2 minutes.

15. The method of claim 9, wherein said pressure is initially 2000 psi and said preselected time is greater than 1 minute.

16. The method of claim 9, wherein said pressure decays at a decay rate which decreases to substantially zero during said preselected time.

17. The method of claim 9, wherein said pressure has an initial decay rate of magnitude greater than 2 pounds per square inch per second and a final decay rate of magnitude less than 0.2 pounds per square inch per second.

18. The method of claim 9, wherein said pressure has an initial decay rate of magnitude greater than 2 pounds per square inch per second and a final decay rate of magnitude less than 0.4 pounds per square inch per second.

19. A process for making a block of densified polymer material from expanded polymer material having a first direction, a second direction and a third direction relative thereto, said process comprising the steps of:

compressing an expanded polymer material to a high density comprising the steps of:
compressing said expanded polymer material in said first direction to a first intermediate density;
compressing said expanded polymer material in said second direction to a second intermediate density;
compressing said expanded polymer material in said third direction to a third density to form a block of densified material;

maintaining said block of densified material an increased density substantially equal to said third density;

degassing said block of densified material;

maintaining a pressure of sufficient magnitude to induce substantial mechanical creep in said block of densified material;

maintaining said pressure on said block of densified material for a preselected time corresponding to a permanent conformation of said block of densified material to substantially said increased density and corresponding to substantial cessation of said mechanical creep; and discharging said expanded polymer material as a densified polymer material, unrestrained in any dimension, to ambient, said densified polymer having substantially said increased density.

20. The process of claim 19 further comprising the initial steps of setting an automatic control system to control all subsequent steps.

21. The process of claim 20 wherein said step of setting an automatic control system is followed by unattended execution of all subsequent steps.

22. The process of claim 19 further including a last step of returning to the first step to execute all subsequent steps repeatedly and continuously.

\* \* \* \* \*